United States Patent [19]
Sadjadian et al.

[11] Patent Number: 5,539,475
[45] Date of Patent: Jul. 23, 1996

[54] METHOD OF AND APPARATUS FOR DERIVING A KEY SIGNAL FROM A DIGITAL VIDEO SIGNAL

[75] Inventors: Ahmad Sadjadian, Woodall Park, England; Terence R. Hurley, Pencoed Technology Park, Wales

[73] Assignees: Sony Corporation, Tokyo, Japan; Sony United Kingdom Limited, Surrey, England

[21] Appl. No.: 303,645

[22] Filed: Sep. 9, 1994

[30] Foreign Application Priority Data

Sep. 10, 1993 [GB] United Kingdom ............ 9318778

[51] Int. Cl.$^6$ .................. H04N 5/275; H04N 5/272
[52] U.S. Cl. .................. 348/591; 348/584
[58] Field of Search .................. 348/594, 593, 348/592, 591, 590, 587, 586, 597, 599, 595, 596, 584, 585, 588, 589, 598, 600, 578, 625, 629, 628; H04N 5/265, 5/275, 5/272

[56] References Cited

U.S. PATENT DOCUMENTS

| | | | |
|---|---|---|---|
| 4,533,937 | 8/1985 | Yamamoto et al. | 358/22 |
| 4,771,192 | 9/1988 | Jackson | 358/183 |
| 4,831,447 | 5/1989 | Lake, Jr. | 358/183 |
| 4,920,415 | 4/1990 | Chaplin | 358/183 |
| 4,949,177 | 8/1990 | Bannister et al. | 358/183 |
| 5,043,800 | 8/1991 | Snashall et al. | 358/22 |
| 5,142,368 | 8/1992 | Pohl | 358/183 |

FOREIGN PATENT DOCUMENTS 0360518  3/1990  European Pat. Off. ....... H04N 5/275

*Primary Examiner*—Safet Metjahic
*Attorney, Agent, or Firm*—William S. Frommer; Alvin Sinderbrand

[57] ABSTRACT

In deriving a key signal for a digital mixer from an input video signal, most values of the key signal are derived by a clip and gain circuit. However, in the special case where the normalized product values for adjacent pixels lie on opposite sides of the upper and lower bounds, the following equations are used to determine the key values ($K_i$ and $K_h$) for the two adjacent pixels:

$$K_i = 0.5\,(Ub-Lb)*[P_h - 0.5\,(Ub-Lb)]/(P_h - P_i),$$

$$K_h = K_i + 0.5\,(Ub-Lb),$$

where Ub and Lb are the upper and lower bound values respectively, and $P_i$ and $P_h$ are respectively the lower and higher product values of said two adjacent pixels.

14 Claims, 3 Drawing Sheets

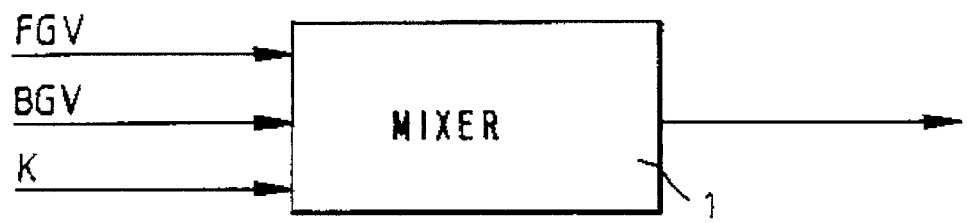
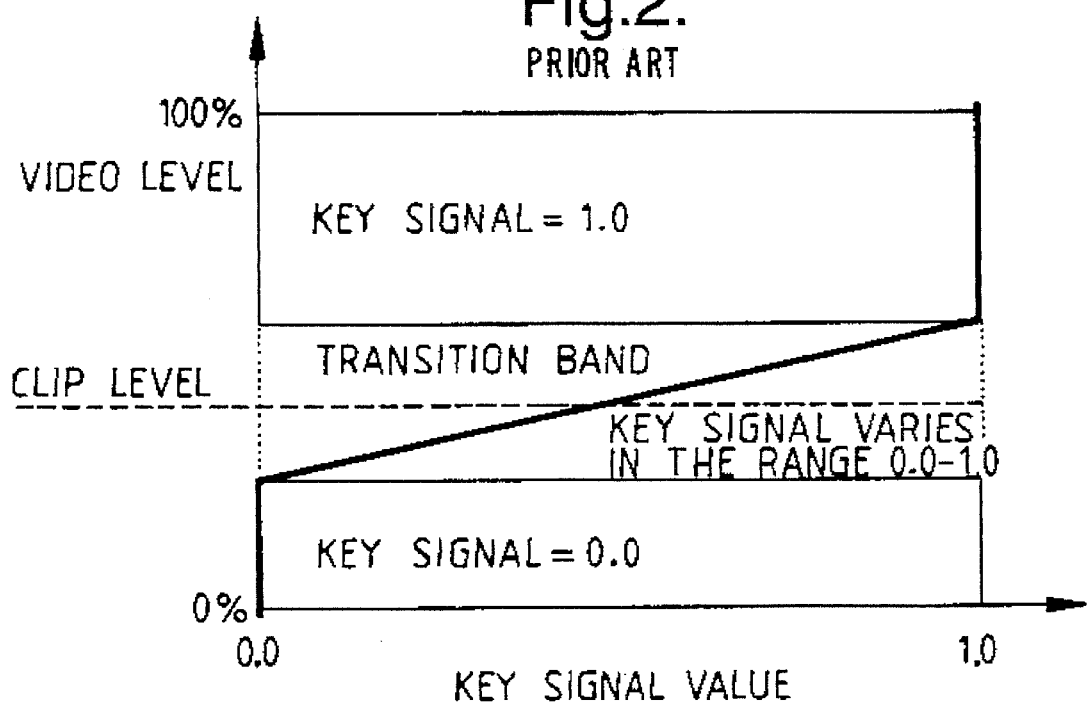

METHOD OF AND APPARATUS FOR DERIVING A KEY SIGNAL FROM A DIGITAL VIDEO SIGNAL

FIELD OF THE INVENTION

The present inaction relates to a method of, and apparatus for, deriving a key signal from a digital video signal for use in mixing foreground and background video signals.

BACKGROUND OF THE INVENTION

The subject of digital keyers and digital key signal generation has received considerable attention in the recent years. Several methods have been proposed and implemented by workers in this field, see for example: EP-A-0,360,518, EP-A-0,360,559, EP-A-0,360,557, EP-A-0,264,965, EP-A-0,360,560, EP-A-0,267,553, EP-A-0,236,943, EP-A-0,425,111 and U.S. Pat. No. 4,920,415.

'Keying' or overlaying of different video scenes is a common operation in video production. A key consists of three components:

(a) A background video signal, BGV;

(b) A foreground video signal, FGV; and (c) A key signal, K.

As shown in FIG. 1 of the accompanying drawings these three signals are typically fed to a mixer 1. The key signal acts as the control signal for the mixer and can vary in the range 0.0 to 1.0 inclusive. When the key signal is equal to 1.0, the output of the mixer is foreground video. Similarly when the key signal is equal to 0.0, the mixer output is background video. When the key is between 0.0 and 1.0, the mixer output is a proportional mix of foreground and background videos.

A circuit known in the art for extraction of key signal from a foreground video signal is called a 'Clip and Gain' circuit. A typical clip and gain circuit compares the level of the incoming video signal against a threshold level, called the Clip level. As shown in FIG. 2, if the video level is well below the clip level, the key signal value is zero. Similarly if the video level is well above the clip level, the key signal value is one. When the video level is equal to the clip level, the key signal value is 0.50. If the level of incoming video falls in a band centered by the clip level and with a width determined by the gain parameter (this is called the transition band), then the key signal value varies between 0.0 and 1.0. This is to ensure that there will be a soft transition from background video to foreground video in the constituted output video.

As the value of the gain parameter increases, the width of the transition band reduces and vice versa. High values of gain parameter cause a small transition band, meaning an abrupt switch at the mixer output between the foreground and background videos. Low gain values cause gradual transitions between the foreground and background videos. The clip and gain levels can be set for the desired effect.

A problem with keying techniques in digital video is the stair-stepping phenomenon. Each active line of the digital video signal is subdivided into pixels. A line of active video, in normal definition, is formed of 720 pixels (in High Definition the corresponding number is 1920). The visual result of imposing a discrete horizontal structure on a video signal is that a smoothly curved edge, will at best, be poorly represented. If a key signal is derived from this video signal, it will include a stair-stepping alias impairment of the original smoothly curved edge. This is due to the fact that the derived key signal will be forced to adopt transition points dictated by the nearest available pixel position to the desired transition position.

FIG. 3(a) shows video levels of a digital video signal. The dotted vertical lines indicate sampling time instances and crossings indicate the video level of each pixel. (Thus the sequence of video levels in this example is 0%, 0%, 0%, 0%, 10%, 90%, 100% and 100%. Note that the level of the video signal abruptly changes from one sample to the next (i.e. from sample 5 to 6).

Assuming that the clip level is set to 30%, a straightforward technique for derivation of the digital key signal (i.e. implementation of the linear relationship between video signal level and key signal value shown in FIG. 2), would lead to the digital key signal shown in FIG. 3(b).

It is important to note that the desired 30% clip level has been totally lost. The key switching on a pixel-to-pixel basis has caused the stair-stepping phenomenon.

In contrast, in analogue video, this problem is less acute in that a corresponding analogue key signal, shown in FIG. 3C, could be derived such that the 50% crossing of the key signal happens at the time when the level of the original analogue video signal (shown by solid line in FIG. 3(a)), reaches 30%.

One way to improve the quality of the digital key signal is to increase the sampling frequency (i.e. use smaller pixels). A fast enough sampling frequency provides a more accurate representation of the transition waveform.

In High Definition video with the sampling frequency standing at a rate exceeding 70 MHz, a further increase of the sampling frequency is not currently technically possible.

SUMMARY OF THE INVENTION

According to the present invention, there is provided a method of generating a key signal for a video mixer from an input video signal having plural pixels. The method comprises the steps of: generating a product value for each pixel as a linear function of the input video signal for that pixel; and comparing the product values of two adjacent pixels with predetermined upper and lower bound values. In the case that the two adjacent pixels lie on opposite sides of the range bounded by said upper and lower bound values, the value of the key signal corresponding to each of said adjacent pixels is determined as a function of both of the product values of said two adjacent pixels.

The present invention also provides an apparatus an apparatus for generating a key signal for a video mixer from an input video signal having plural pixels. The apparatus comprises first means for generating a product value for each pixel as a linear function of an input video signal for that pixel; comparison means for comparing the product values of two adjacent pixels with predetermined upper and lower bound values; and key signal generating means for generating key signal values for each of the adjacent pixels determined as a function of both of the product values of the two adjacent pixels in the case that the two adjacent pixels lie on opposite sides of the range bounded by the predetermined upper and lower bound values.

With the invention, the derived key signal can be employed in a mixer to construct an output video signal from foreground and background input videos. Utilisation of this key signal, rather than a key signal derived using a method known in the art, leads to the construction of a more eye-pleasing output video. The output video is more pleasing to the eye because the method of key signal generation according to the invention enhances the quality of the key signal by reducing impairments caused by the 'stair-stepping' phenomenon.

BRIEF DESCRIPTION OF THE DRAWINGS

The present invention will be further described hereinafter with reference to the following description of an exemplary embodiment and the accompanying drawings, in which:

FIG. 1 shows a known video mixer;

FIG. 2 shows the relationship between the video level and key signal value;

In the figures, like parts are indicated by like reference numerals.

DETAILED DESCRIPTION OF THE INVENTION

Figures 3A, 3B, 3C, 3D:
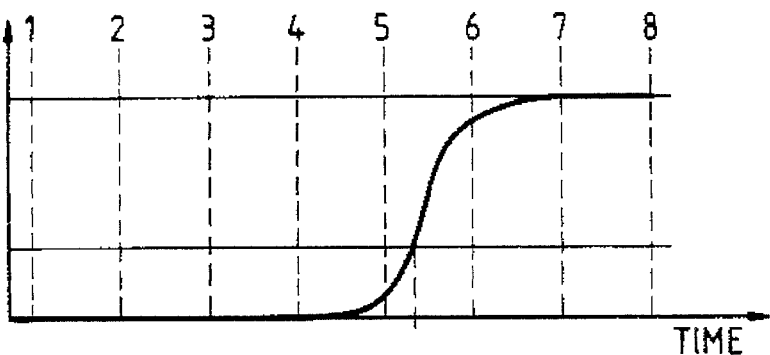
FIGS. 3(a)-3(d) show various video signals and corresponding key signals according to the invention and in the prior art.

With the invention, for each incoming pixel value $V_i$ a Product value $P_i$ is defined such that:

$$P_i = \text{Gain} * (V_i - \text{Clip level}) \qquad (1)$$

A clip and gain circuit produces these product values. Giving the parameters of gain, clip level and input video signal level admissible ranges of $0 < \text{Gain} < 128$, $16 < \text{Clip level} < 235$ and $16 < \text{Video signal level} < 235$ respectively; the range of possible values of $P_i$ is: $-28032 < P_i < 28032$. A normalized product value $P'_i$ is generated from $P_i$ by dividing by 4 (effectively shifting it by 2 bits rightwards), adding 4096 and limiting so that $P'_i$ varies between 0 and 8191, taking the value 4096 when the video signal equals the clip level.

Next, two constants, Upper bound (Ub) and Lower bound (Lb), are introduced such that Ub>Lb. Ub and Lb can take values in the range 0 to 8191.

Ub, Lb gain and clip are selected by the user for each image in order to achieve the desired effect. Frequently the user will experiment with different values and combinations before the desired result is achieved.

The final output Digital Key Signal $K_i$ (a 13-bit unipolar binary sequence) is then calculated by comparing the normalized product value with the Upper and Lower bounds to produce a number in the range 0 to 8191 where 0 corresponds to key value of 0.0 and 8191 corresponds to key value of 1.0.

This is achieved by calculating $K_i$ according to the following conditions:

$$\text{If } Lb < P'_i < Ub \text{ then } K_i = P'_i, \qquad (2)$$

$$\text{If } P'_i < Lb \text{ then } K_i = 0, \text{ and} \qquad (3)$$

$$\text{If } P'_i > Ub \text{ then } K_i = 8191; \qquad (4)$$

except in two special cases when different conditions are used. Assuming that $P_a$ and $P_b$ are (not normalized) product values corresponding to two consecutive pixels, the two cases seeking special treatment are:

Case 1- $Ub \dfrac{P'_b}{}$ $(P'_a < Lb)$ and $(P'_b > Ub)$. $\quad Lb \dfrac{}{P_a}$ Case 2- $Ub \dfrac{P_a}{}$ $(P'_a > Ub)$ and $(P'_b < 0)$. $\quad Lb \dfrac{}{P_b}$ In both cases key signal values are calculated from the following equations (equations 2, 3 and 4 are not then used):

$$K_l = 0.5 \ (Ub - Lb) * [P_h - 0.5(Ub - Lb)]/(P_h - P_l) \qquad (5)$$

$$K_h = K_l + 0.5(Ub - Lb). \qquad (6)$$

where l and h respectively indicate the lower and the higher of $P_a$ and $P_b$.

Application of this technique for derivation of digital key signal from input video shown in FIG. 3(a) leads to the digital key signal shown in FIG. 3(d). Here digital input video is 8 bit wide with admissible range of 16 to 235, Ub=8191, Lb=0 and the following values have been selected for the parameters gain and clip:

gain=64, clip at 30%.

All digital key values except $K_5$ and $K_6$ (i.e. key signal levels corresponding to input video samples 5 and 6), are computed using simple equations (3) and (4).

Clip level at 30% corresponds to video level 82. Consequently using equation (1):

$$P_5 = 64 * (38-82) = -2816 \text{ and } P_6 = 64 * (214-82) = 8448$$

Values of $K_5$ and $K_6$ are computed using equations (5) and (6), respectively:

$$K_5 = 0.5 \ (8191 - 0) * [8448 - 0.5 \ (8191 - 0)]/(8448 + 2816) = 1669$$

$$K_6 = 1582 + 0.5 * (8191 - 0) = 5765$$

Bearing in mind that in this implementation key values are represented by 13 bit unipolar numbers, these values of $K_5$ and $K_6$ correspond to key values 0.20 and 0.70 within the 0.0 to 1.0 conventional key signal range (FIG. 3(d)).

The net result of employment of the newly developed key generation scheme for the case of video input signal presented in FIG. 3(a) has been a reconstitution of the digital key signal. The sequence of key values has now changed to 0.0, 0.0, 0.0, 0.0, 0.19, 0.69, 1.0, 1.0. This is in contrast to the sequence 0.0, 0.0, 0.0, 0.0, 0.10, 0.90, 1.0, 1.0 previously obtained for the digital key values. The new sequence is a much better representation of the desired 30% clip level. The clip level now has not been lost.

Figure 4:
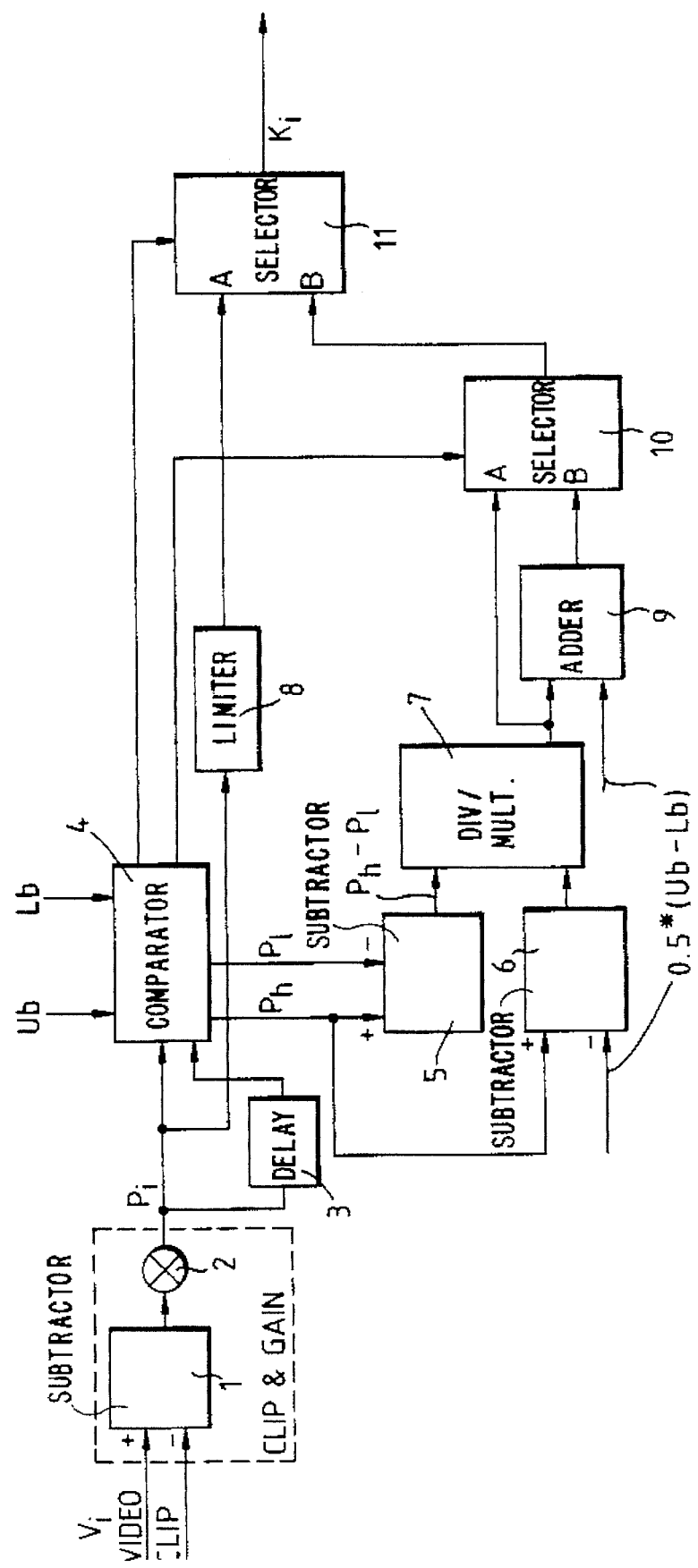
FIG. 4 is a schematic diagram of an embodiment of the invention.

FIG. 4 shows a circuit implementation of the technique described above. The clip and gain circuit is also shown on this diagram.

Subtracter 1 and multiplier 2 form the clip and gain circuit and output the product values $P_i$. The delay unit 3 introduces a one pixel delay on the product values and its output is fed to the comparator unit 4. The product values are fed to comparator 4 as well as to the limiter unit 8.

Comparator 4 provides $P_h$ and $P_l$ to the subtracter 5. The $P_h$ value is also fed to subtracter 6. Subtracter 5 produces the $(P_h - P_l)$ value used in equation (5) which is then fed to the divider/multiplier unit 7 as divisor. The other input to the divider, the dividend, is provided by the subtracter unit 6 which computes the term $[P_h - 0.5 * (Ub-Lb)]$ in equation (5). The divider/multiplier 7 divides $[P_h - 0.5 * (Ub-Lb)]$ by $(P_h - P_l)$ and multiplies this by $0.5 \ (Ub - Lb)$. The output of the divider is fed to the adder unit 9 as well as selector unit 10. Adder unit 9 is responsible for calculation of equation (6) while selector unit 10 selects one of its two inputs and reports this value to the selector unit 11. The decision as to which input is to pass through selector unit 10 comes as a control signal from comparator unit 4. This comparator compares two product values $P_i$ and $P_{i-1}$ (i.e. two product values corresponding to two consecutive pixels on a horizontal line of video) to the constants Ub and Lb and decides whether special key calculation must be used (i.e. whether equations (5) and (6) are to be used).

The limiter unit 8 ensures that the normalized product values do not fall outside the range bounded by Lb and Ub. The limiter output is fed to the selector 11. Finally the comparator unit 4 supplies the control signal for the two to one selector unit 11. In the case of the example worked out earlier, the comparator instructs selector unit 11 to allow its 'A' input to go through as the Digital Key value for all pixels except pixels 5 and 6 when the value on the 'B' input finds its way to the output of the selector unit 11.

The technique of this invention applies equally well to both horizontal and vertical directions. If the technique is to be applied in the vertical direction then the delay unit 3 shown in FIG. 4 needs to introduce a single line delay instead of a single pixel delay.

The invention has been described in detail with particular reference to preferred embodiments thereof, but it will be understood that variations and modifications of it can be effected without departing from the spirit and scope of the invention.

We claim:

1. A method of generating a key signal for a video mixer from an input video signal having plural pixels, the method comprising the steps of:

generating a product value for each pixel as a linear function of said input video signal for that pixel;

comparing the product values of two adjacent pixels with predetermined upper and lower bound values and, in a special case that said two adjacent pixels lie on opposite sides of the range bounded by said predetermined upper and lower bound values, determining a value of said key signal corresponding to each of said adjacent pixels as a function of both of the product values of said two adjacent pixels.

2. A method according to claim 1 wherein said key signal values are determined as a function of the difference between said predetermined upper and lower bound values.

3. A method according to claim 1 wherein one of said key signal values is determined as a function of the other.

4. A method according to claim 1, wherein, in said special case, one of said key signal values is determined by the formula:

$$K_1 = 0.5 \ (Ub-Lb) * [P_h - 0.5 \ (Ub - Lb)]/(P_h - P_1),$$

and the other by the formula:

$$K_h = K_1 = 0.5 \ (Ub - Lb),$$

wherein Ub and Lb are the upper and lower bound values respectively, and $P_1$ and $P_h$ are the lower and higher product values respectively, for said two adjacent pixels.

5. A method according to claim 1 wherein said key signal value for each pixel is otherwise determined as a function of only their respective product value.

6. A method according to claim 5 wherein, said key signal value is equal to said respective product value normalized.

7. A method according to claim 6 wherein said product value is normalized by being scaled and shifted.

8. An apparatus for generating a key signal for a video mixer from an input video signal having plural pixels, the apparatus comprising:

first means for generating a product value for each pixel as a linear function of said input video signal for that pixel;

comparison means for comparing the product values of two adjacent pixels with predetermined upper and lower bound values;

key signal generating means for generating key signal values for each of said adjacent pixels determined as a function of the product values of said two adjacent pixels in a special case that said two adjacent pixels lie on opposite sides of the range bounded by said predetermined upper and lower bound values.

9. An apparatus according to claim 8 wherein said key signal generating means is adapted to determine said key signal values as a function of the difference between said predetermined upper and lower bound values.

10. An apparatus according to claim 8 wherein said key signal generating means is adapted to determine one of said key signal values as a function of the other.

11. An apparatus according to claim 8, wherein said key signal generator comprises:

a first subtracter for subtracting the product value of a first pixel of said two adjacent pixels from that of a second pixel;

a second subtracter for subtracting half of the difference between said predetermined upper and lower bound values from the product value of said second pixel;

a divider for dividing the output of said second subtracter by the output of said first subtracter;

a multiplier for multiplying an output of said divider by half the difference between said predetermined upper and lower bound values, an output of said multiplier serving as the key signal value for one of said adjacent pixels; and an adder for adding half the difference between said predetermined upper and lower bound values to the output of said multiplier, an output of said adder serving as the key signal of the other of said two adjacent pixels, so that, in said special case, one of said key values is determined by the formula:

$$K_1 = 0.5 \ (Ub-Lb) * [P_h - 0.5 \ (Ub - Lb)]/(P_h - P_1),$$

and the other by the formula:

$$K_h = K_1 + 0.5 \ (Ub - Lb),$$

wherein Ub and Lb are said predetermined upper and lower bound values respectively, and $P_1$ and $P_h$ are respectively the lower and higher of the product values for said two adjacent pixels.

12. An apparatus according to claim 8 wherein said key signal generating means is adapted to generate key signal values for other pixels, determined as a function of only their respective product value.

13. An apparatus according to claim 12 wherein said key signal values for said other pixels are equal to said respective product value normalized.

14. An apparatus according to claim 13 wherein said respective product value is normalized by being scaled and shifted.

* * * * *